United States Patent
Moore et al.

(10) Patent No.: US 11,636,490 B2
(45) Date of Patent: Apr. 25, 2023

(54) SYSTEM, METHOD, AND COMPUTER PROGRAM PRODUCT FOR LINKING ACCOUNTS ACROSS SYSTEMS

(71) Applicant: Visa International Service Association, San Francisco, CA (US)

(72) Inventors: Jeffrey Moore, San Francisco, CA (US); Saurabh Chopra, Fremont, CA (US); Luba Goldberg, San Francisco, CA (US); Darcy Montgomery Andrews, San Francisco, CA (US); Claire Taitague Feeley, London (GB)

(73) Assignee: Visa International Service Association, San Francisco, CA (US)

( * ) Notice: Subject to any disclaimer, the term of this patent is extended or adjusted under 35 U.S.C. 154(b) by 12 days.

(21) Appl. No.: 16/745,577

(22) Filed: Jan. 17, 2020

(65) Prior Publication Data

US 2021/0224816 A1 Jul. 22, 2021

(51) Int. Cl.
| | |
|---|---|
| *G06Q 20/42* | (2012.01) |
| *G06Q 20/40* | (2012.01) |
| *G06Q 20/36* | (2012.01) |
| *G06Q 20/06* | (2012.01) |

(52) U.S. Cl.
CPC ....... *G06Q 20/425* (2013.01); *G06Q 20/0658* (2013.01); *G06Q 20/3678* (2013.01); *G06Q 20/4012* (2013.01)

(58) Field of Classification Search
CPC ............. G06Q 20/425; G06Q 20/4012; G06Q 20/3678; G06Q 20/0658; G06Q 20/10; G06Q 20/387; G06Q 20/202; G06Q 20/204; G06Q 20/385
See application file for complete search history.

(56) References Cited

U.S. PATENT DOCUMENTS

| | | | |
|---|---|---|---|
| 11,055,678 B1 * | 7/2021 | Christensen | ......... G06Q 20/341 |
| 2014/0081729 A1 | 3/2014 | Ocher | |

(Continued)

FOREIGN PATENT DOCUMENTS

| | | | |
|---|---|---|---|
| CN | 105874493 A | 8/2016 | |
| CN | 109155030 A * | 1/2019 | ............. G06Q 20/12 |
| KR | 1020080022888 A | 3/2008 | |

*Primary Examiner* — Neha Patel
*Assistant Examiner* — Chunling Ding
(74) *Attorney, Agent, or Firm* — The Webb Law Firm

(57) ABSTRACT

Provided are computer-implemented methods for linking accounts across systems which may include receiving an authorization request message including transaction data associated with a payment transaction and a primary account number (PAN); identifying a token corresponding to the PAN; transmitting a request message comprising at least a portion of the transaction data associated with the payment transaction and the token to at least one employer system, wherein the at least one employer system is associated with at least one employer institution; and receiving, from the at least one employer system, at least one response message comprising transaction adjustment data associated with an adjustment to the payment transaction. Methods may also include adjusting at least one parameter of the payment transaction based at least partially on the transaction adjustment data. Systems and computer program products are also provided.

17 Claims, 7 Drawing Sheets

(56) References Cited

U.S. PATENT DOCUMENTS

| | | | |
|---|---|---|---|
| 2014/0188586 A1* | 7/2014 | Carpenter | G06Q 20/3821 |
| | | | 705/14.23 |
| 2014/0278567 A1* | 9/2014 | Flanagan | G06Q 10/10 |
| | | | 705/4 |
| 2014/0297307 A1* | 10/2014 | Pletz | G06Q 10/10 |
| | | | 705/2 |
| 2015/0046338 A1* | 2/2015 | Laxminarayanan | |
| | | | G06Q 20/38215 |
| | | | 705/67 |
| 2015/0193745 A1* | 7/2015 | Handwerger | G06Q 30/0201 |
| | | | 705/39 |
| 2015/0287067 A1* | 10/2015 | Robeen | G06Q 20/40 |
| | | | 705/14.27 |
| 2017/0293901 A1* | 10/2017 | Savla | G06Q 20/387 |
| 2018/0107994 A1* | 4/2018 | Anderson | G06Q 20/227 |
| 2019/0108512 A1* | 4/2019 | Radu | G06Q 20/34 |
| 2020/0082427 A1* | 3/2020 | Gleeson | G06Q 30/0226 |

\* cited by examiner

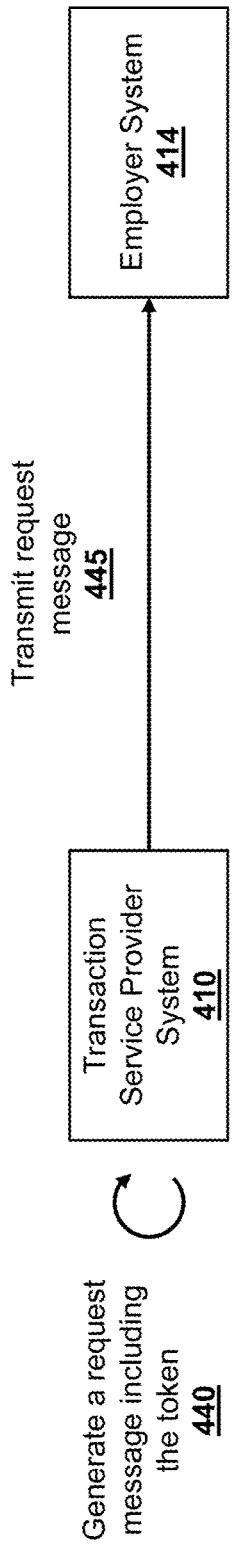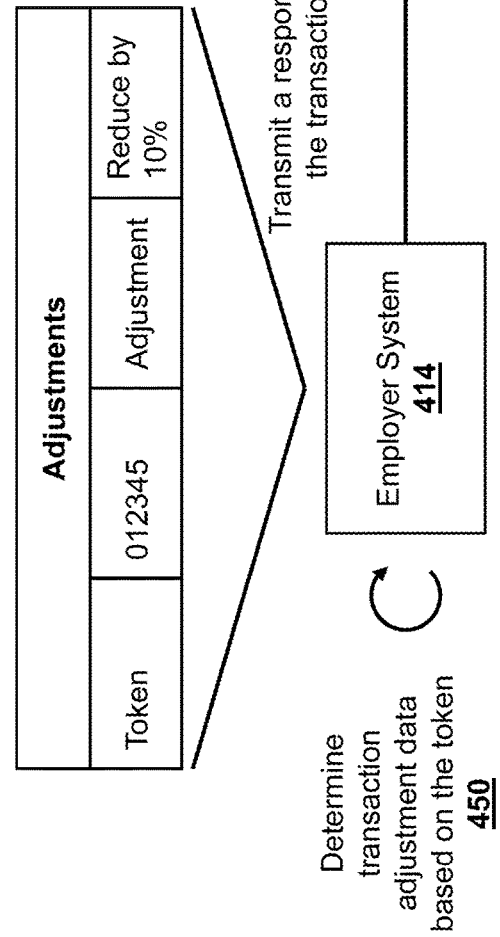

SYSTEM, METHOD, AND COMPUTER PROGRAM PRODUCT FOR LINKING ACCOUNTS ACROSS SYSTEMS

BACKGROUND

1. Technical Field

This disclosure relates generally to linking accounts across systems and, in some non-limiting embodiments or aspects, to systems, methods, and computer program products for linking accounts across systems involved in payment transaction processing.

2. Technical Considerations

Individuals may make purchases that include adjusting the value of a payment transaction generated during the purchase. For example, an individual may be involved in (e.g., may initiate) a payment transaction that also involves a merchant such as, for example, an office supply store, a pharmacy, and/or the like. To initiate the payment transaction, the individual may provide a payment device (e.g., a credit card, a debit card, and/or the like that corresponds to a payment account) to a system associated with the merchant (e.g., a point-of-sale system) or an individual operating the system. The system may then generate an authorization request message based on the payment transaction and transmit the authorization request message to one or more other systems (e.g., a transaction service provider system) to complete the payment transaction.

In some examples, the individual initiating the purchase may also provide a secondary device (e.g., a benefits card, an employer identification card, and/or the like) during purchase to reduce the amount due for the payment transaction. For example, the individual may provide the secondary device to indicate to an individual operating the merchant system that the amount due for the payment transaction should be reduced. The individual associated with the merchant may then provide input to the system to cause the system to reduce the amount due for the payment transaction.

However, these systems may be inefficient with individuals operating merchant systems having to provide input to the system associated with the merchant based on receiving the secondary device. For example, the system associated with the merchant may generate additional messages and transmit the additional message (e.g., to an employer system) to verify that the amount due for the payment transaction should be reduced. This, in turn, may increase the amount of network traffic consumed to complete the payment transaction and/or processing time involved with the one or more other systems. Further, by virtue of human error, individuals initiating the above-noted payment transactions may have to wait an increased amount of time if individuals providing the input to the system associated with the merchant provide incorrect and/or inaccurate input to the system and/or while the individual providing the input verifies the identity of the individual providing the secondary device (e.g., by comparing the secondary device to another device identifying the individual).

SUMMARY

Accordingly, disclosed are improved systems, methods, and computer program products for linking accounts across systems.

According to some non-limiting embodiments or aspects, provided is a system for linking accounts across systems, the system including at least one processor programmed or configured to: in response to receiving an authorization request message including transaction data associated with a payment transaction and a primary account number (PAN), identify a token corresponding to the PAN; transmit a request message including at least a portion of the transaction data associated with the payment transaction and the token to at least one employer system, wherein the at least one employer system is associated with at least one employer institution; and in response to receiving, from the at least one employer system, at least one response message including transaction adjustment data associated with an adjustment to the payment transaction, adjust at least one parameter of the payment transaction based at least partially on the transaction adjustment data.

In some non-limiting embodiments or aspects, the at least one processor may be further programmed or configured to: compare, at the at least one employer system, one or more applicable adjustments to the payment transaction and the token; determine, at the at least one employer system, an adjustment to the payment transaction based on comparing the one or more applicable adjustments to the payment transaction and the token; and generate, at the at least one employer system, the transaction adjustment data associated with the adjustment to the payment transaction.

In some non-limiting embodiments or aspects, the at least one processor may be further programmed or configured to: determine at least one identifier for at least one item involved in the payment transaction based on the transaction data associated with the payment transaction, wherein, when transmitting the request message including at least a portion of the transaction data associated with the payment transaction and the token to at least one employer system, the at least one processor is programmed or configured to: transmit the request message including at least a portion of the transaction data associated with the payment transaction, the token, and the at least one identifier for the at least one item to the at least one employer system.

In some non-limiting embodiments or aspects, the at least one processor may be further programmed or configured to: compare, by the at least one employer system, the at least one identifier for the at least one item to a plurality of predetermined identifiers associated with a plurality of predetermined items; determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message including the transaction adjustment data associated with the adjustment to the payment transaction based on the at least one predetermined identifier associated with the predetermined item.

In some non-limiting embodiments or aspects, the at least one response message may include a plurality of response messages, and the at least one processor may be further programmed or configured to: compare the transaction adjustment data in each of the plurality of response messages to the transaction adjustment data in each of the other response messages of the plurality of response messages; and select a response message of the plurality of response messages based on comparing the transaction adjustment data in each of the plurality of response messages to the transaction adjustment data in each of the other response messages of the plurality of response messages. In some non-limiting embodiments or aspects, when adjusting the at least one parameter of the payment transaction based at least partially on the transaction adjustment data, the at least one processor may be programmed or configured to: adjust the at least one parameter of the payment transaction based at least partially on the transaction adjustment data of the response message that was selected from the plurality of response messages.

In some non-limiting embodiments or aspects, when selecting the response message of the plurality of response messages based on comparing the transaction adjustment data in each of the plurality of response messages to the transaction adjustment data in each of the other response messages of the plurality of response messages, the at least one processor may be programmed or configured to: determine that the response message selected from the plurality of response messages includes transaction adjustment data associated with the adjustment to the payment transaction that is greater than the transaction adjustment data associated with the adjustment to the payment transaction of the other response messages of the plurality of response messages.

In some non-limiting embodiments or aspects, the at least one processor may be further programmed or configured to: receive, by the at least one employer system, registration data associated with a plurality of employees. In some non-limiting embodiments or aspects, the registration data may include a plurality of PANs corresponding to the plurality of employees. In some non-limiting embodiments or aspects, the at least one processor may be further programmed or configured to generate, by the at least one employer system, a plurality of tokens corresponding to the plurality of PANs; and transmit, by the at least one employer system, the plurality of tokens in association with the plurality of PANs to a transaction service provider system.

According to some non-limiting embodiments or aspects, provided is a computer-implemented method, the computer-implemented method including: receiving, with at least one processor, an authorization request message including transaction data associated with a payment transaction and a primary account number (PAN); identifying, with at least one processor, a token corresponding to the PAN; transmitting, with at least one processor, a request message including at least a portion of the transaction data associated with the payment transaction and the token to at least one employer system, wherein the at least one employer system is associated with at least one employer institution; and in response to receiving, from the at least one employer system, at least one response message including transaction adjustment data associated with an adjustment to the payment transaction, adjusting, with at least one processor, at least one parameter of the payment transaction based at least partially on the transaction adjustment data.

In some non-limiting embodiments or aspects, the computer-implemented method may further include: comparing, with at least one processor, one or more applicable adjustments to the payment transaction and the token; determining, with at least one processor, an adjustment to the payment transaction based on comparing the one or more applicable adjustments to the payment transaction and the token; and generating, with at least one processor, the transaction adjustment data associated with the adjustment to the payment transaction.

In some non-limiting embodiments or aspects, the computer-implemented method may further include: determining, with at least one processor, at least one identifier for at least one item involved in the payment transaction based on the transaction data associated with the payment transaction. In some non-limiting embodiments or aspects, transmitting the request message including at least a portion of the transaction data associated with the payment transaction and the token to at least one employer system may include: transmitting, with at least one processor, the request message including at least a portion of the transaction data associated with the payment transaction, the token, and the at least one identifier for the at least one item to the at least one employer system.

In some non-limiting embodiments or aspects, the computer-implemented method may further include: comparing, with at least one processor, the at least one identifier for the at least one item to a plurality of predetermined identifiers associated with a plurality of predetermined items; determining, with at least one processor, that the at least one identifier corresponds to at least one predetermined identifier associated with a predetermined item based on comparing the at least one identifier for the at least one item to the plurality of predetermined identifiers associated with the plurality of predetermined items; and transmitting, with at least one processor, the at least one response message including the transaction adjustment data associated with the adjustment to the payment transaction based on the at least one predetermined identifier associated with the predetermined item.

In some non-limiting embodiments or aspects, the at least one response message includes a plurality of response messages. In some non-limiting embodiments or aspects, the computer-implemented method may further include: comparing, with at least one processor, the transaction adjustment data in each of the plurality of response messages to the transaction adjustment data in each of the other response messages of the plurality of response messages; and selecting, with at least one processor, a response message of the plurality of response messages based on comparing the transaction adjustment data in each of the plurality of response messages to the transaction adjustment data in each of the other response messages of the plurality of response messages. In some non-limiting embodiments or aspects, adjusting the at least one parameter of the payment transaction based at least partially on the transaction adjustment data may include: adjusting, with at least one processor, the at least one parameter of the payment transaction based at least partially on the transaction adjustment data of the response message that was selected from the plurality of response messages.

In some non-limiting embodiments or aspects, selecting the response message of the plurality of response messages based on comparing the transaction adjustment data in each of the plurality of response messages to the transaction adjustment data in each of the other response messages of the plurality of response messages may include: determining, with at least one processor, that the response message selected from the plurality of response messages includes transaction adjustment data associated with the adjustment to the payment transaction that is greater than the transaction adjustment data associated with the adjustment to the payment transaction of the other response messages of the plurality of response messages.

In some non-limiting embodiments or aspects, the computer-implemented method may further include: receiving, with at least one processor, registration data associated with a plurality of employees, the registration data including: a plurality of PANs corresponding to the plurality of employees; generating, with at least one processor, a plurality of tokens corresponding to the plurality of PANs; and transmitting, with at least one processor, the plurality of tokens in association with the plurality of PANs to a transaction service provider system.

According to some non-limiting embodiments or aspects, provided is a computer program product for linking accounts across systems, the computer program product including at least one non-transitory computer-readable medium, including one or more instructions that, when executed by at least one processor, cause the at least one processor to: in response to receiving an authorization request message including transaction data associated with a payment transaction and a primary account number (PAN), identify a token corresponding to the PAN; transmit a request message including at least a portion of the transaction data associated with the payment transaction and the token to at least one employer system, wherein the at least one employer system is associated with at least one employer institution; and wherein the request message is configured to cause the at least one employer system to: compare, at the at least one employer system, one or more applicable adjustments to the payment transaction and the token; determine, at the at least one employer system, an adjustment to the payment transaction based on comparing the one or more applicable adjustments to the payment transaction and the token; and generate, at the at least one employer system, the transaction adjustment data associated with the adjustment to the payment transaction, and in response to receiving, from the at least one employer system, at least one response message including transaction adjustment data associated with an adjustment to the payment transaction, adjust at least one parameter of the payment transaction based at least partially on the transaction adjustment data.

In some non-limiting embodiments or aspects, the one or more instructions may further cause the at least one processor to: determine at least one identifier for at least one item involved in the payment transaction based on the transaction data associated with the payment transaction. In some non-limiting embodiments or aspects, when transmitting the request message including at least a portion of the transaction data associated with the payment transaction and the token to at least one employer system, the at least one processor may be programmed or configured to: transmit the request message including at least a portion of the transaction data associated with the payment transaction, the token, and the at least one identifier for the at least one item to the at least one employer system.

In some non-limiting embodiments or aspects, the one or more instructions further cause the at least one processor to: compare, by the at least one employer system, the at least one identifier for the at least one item to a plurality of predetermined identifiers associated with a plurality of predetermined items; determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message including the transaction adjustment data associated with the adjustment to the payment transaction based on the at least one predetermined identifier associated with the predetermined item.

In some non-limiting embodiments or aspects, the at least one response message may include a plurality of response messages. In some non-limiting embodiments or aspects, the one or more instructions may further cause the at least one processor to: compare the transaction adjustment data in each of the plurality of response messages to the transaction adjustment data in each of the other response messages of the plurality of response messages; and select a response message of the plurality of response messages based on comparing the transaction adjustment data in each of the plurality of response messages to the transaction adjustment data in each of the other response messages of the plurality of response messages. In some non-limiting embodiments or aspects, when adjusting the at least one parameter of the payment transaction based at least partially on the transaction adjustment data, the at least one processor may be programmed or configured to: adjust the at least one parameter of the payment transaction based at least partially on the transaction adjustment data of the response message that was selected from the plurality of response messages.

In some non-limiting embodiments or aspects, the one or more instructions that cause the at least one processor to select the response message of the plurality of response messages based on comparing the transaction adjustment data in each of the plurality of response messages to the transaction adjustment data in each of the other response messages of the plurality of response messages may cause the at least one processor to: determine that the response message selected from the plurality of response messages includes transaction adjustment data associated with the adjustment to the payment transaction that is greater than the transaction adjustment data associated with the adjustment to the payment transaction of the other response messages of the plurality of response messages.

In some non-limiting embodiments or aspects, the one or more instructions may further cause the at least one processor to: receive, by the at least one employer system, registration data associated with a plurality of employees, the registration data including: a plurality of PANs corresponding to the plurality of employees; generate, by the at least one employer system, a plurality of tokens corresponding to the plurality of PANs; and transmit, by the at least one employer system, the plurality of tokens in association with the plurality of PANs to a transaction service provider system.

Further non-limiting embodiments or aspects are set forth in the following numbered clauses:

Clause 1: A system, comprising: at least one processor programmed or configured to: in response to receiving an authorization request message comprising transaction data associated with a payment transaction and a primary account number (PAN), identify a token corresponding to the PAN; transmit a request message comprising at least a portion of the transaction data associated with the payment transaction and the token to at least one employer system, wherein the at least one employer system is associated with at least one employer institution; and in response to receiving, from the at least one employer system, at least one response message comprising transaction adjustment data associated with an adjustment to the payment transaction, adjust at least one parameter of the payment transaction based at least partially on the transaction adjustment data.

Clause 2: The system of clause 1, wherein the at least one processor is further programmed or configured to: compare, at the at least one employer system, one or more applicable adjustments to the payment transaction and the token; determine, at the at least one employer system, an adjustment to the payment transaction based on comparing the one or more applicable adjustments to the payment transaction and the token; and generate, at the at least one employer system, the transaction adjustment data associated with the adjustment to the payment transaction.

Clause 3: The system of clauses 1 or 2, wherein the at least one processor is further programmed or configured to: determine at least one identifier for at least one item involved in the payment transaction based on the transaction data associated with the payment transaction, wherein, when transmitting the request message comprising at least a portion of the transaction data associated with the payment transaction and the token to at least one employer system, the at least one processor is programmed or configured to: transmit the request message comprising at least a portion of the transaction data associated with the payment transaction, the token, and the at least one identifier for the at least one item to the at least one employer system.

Clause 4: The system of any of clauses 1-3, wherein the at least one processor is further programmed or configured to: compare, by the at least one employer system, the at least one identifier for the at least one item to a plurality of predetermined identifiers associated with a plurality of predetermined items; determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message comprising the transaction adjustment data associated with the adjustment to the payment transaction based on the at least one predetermined identifier associated with the predetermined item.

Clause 5: The system of any of clauses 1-4, wherein the at least one response message comprises a plurality of response messages, and wherein the at least one processor is further programmed or configured to: compare the transaction adjustment data in each of the plurality of response messages to the transaction adjustment data in each of the other response messages of the plurality of response messages; and select a response message of the plurality of response messages based on comparing the transaction adjustment data in each of the plurality of response messages to the transaction adjustment data in each of the other response messages of the plurality of response messages, wherein, when adjusting the at least one parameter of the payment transaction based at least partially on the transaction adjustment data, the at least one processor is programmed or configured to: adjust the at least one parameter of the payment transaction based at least partially on the transaction adjustment data of the response message that was selected from the plurality of response messages.

Clause 6: The system of any of clauses 1-5, wherein, when selecting the response message of the plurality of response messages based on comparing the transaction adjustment data in each of the plurality of response messages to the transaction adjustment data in each of the other response messages of the plurality of response messages, the at least one processor is programmed or configured to: determine that the response message selected from the plurality of response messages includes transaction adjustment data associated with the adjustment to the payment transaction that is greater than the transaction adjustment data associated with the adjustment to the payment transaction of the other response messages of the plurality of response messages.

Clause 7: The system of any of clauses 1-6, wherein the at least one processor is further programmed or configured to: receive, by the at least one employer system, registration data associated with a plurality of employees, the registration data comprising: a plurality of PANs corresponding to the plurality of employees; generate, by the at least one employer system, a plurality of tokens corresponding to the plurality of PANs; and transmit, by the at least one employer system, the plurality of tokens in association with the plurality of PANs to a transaction service provider system.

Clause 8: A computer-implemented method, comprising: receiving, with at least one processor, an authorization request message comprising transaction data associated with a payment transaction and a primary account number (PAN); identifying, with at least one processor, a token corresponding to the PAN; transmitting, with at least one processor, a request message comprising at least a portion of the transaction data associated with the payment transaction and the token to at least one employer system, wherein the at least one employer system is associated with at least one employer institution; and in response to receiving, from the at least one employer system, at least one response message comprising transaction adjustment data associated with an adjustment to the payment transaction, adjusting, with at least one processor, at least one parameter of the payment transaction based at least partially on the transaction adjustment data.

Clause 9: The computer-implemented method of clause 8, further comprising: comparing, with at least one processor, one or more applicable adjustments to the payment transaction and the token; determining, with at least one processor, an adjustment to the payment transaction based on comparing the one or more applicable adjustments to the payment transaction and the token; and generating, with at least one processor, the transaction adjustment data associated with the adjustment to the payment transaction.

Clause 10: The computer-implemented method of clauses 8 or 9, further comprising: determining, with at least one processor, at least one identifier for at least one item involved in the payment transaction based on the transaction data associated with the payment transaction, wherein transmitting the request message comprising at least a portion of the transaction data associated with the payment transaction and the token to at least one employer system comprises: transmitting, with at least one processor, the request message comprising at least a portion of the transaction data associated with the payment transaction, the token, and the at least one identifier for the at least one item to the at least one employer system.

Clause 11: The computer-implemented method of any of clauses 8-10, further comprising: comparing, with at least one processor, the at least one identifier for the at least one item to a plurality of predetermined identifiers associated with a plurality of predetermined items; determining, with at least one processor, that the at least one identifier corresponds to at least one predetermined identifier associated with a predetermined item based on comparing the at least one identifier for the at least one item to the plurality of predetermined identifiers associated with the plurality of predetermined items; and transmitting, with at least one processor, the at least one response message comprising the transaction adjustment data associated with the adjustment to the payment transaction based on the at least one predetermined identifier associated with the predetermined item.

Clause 12: The computer-implemented method of any of clauses 8-11, wherein the at least one response message comprises a plurality of response messages, and wherein the computer-implemented method further comprises: comparing, with at least one processor, the transaction adjustment data in each of the plurality of response messages to the transaction adjustment data in each of the other response messages of the plurality of response messages; and selecting, with at least one processor, a response message of the plurality of response messages based on comparing the transaction adjustment data in each of the plurality of response messages to the transaction adjustment data in each of the other response messages of the plurality of response messages, wherein adjusting the at least one parameter of the payment transaction based at least partially on the transaction adjustment data comprises: adjusting, with at least one processor, the at least one parameter of the payment transaction based at least partially on the transaction adjustment data of the response message that was selected from the plurality of response messages.

Clause 13: The computer-implemented method of any of clauses 8-12, wherein selecting the response message of the plurality of response messages based on comparing the transaction adjustment data in each of the plurality of response messages to the transaction adjustment data in each of the other response messages of the plurality of response messages comprises: determining, with at least one processor, that the response message selected from the plurality of response messages includes transaction adjustment data associated with the adjustment to the payment transaction that is greater than the transaction adjustment data associated with the adjustment to the payment transaction of the other response messages of the plurality of response messages.

Clause 14: The computer-implemented method of any of clauses 8-13, further comprising: receiving, with at least one processor, registration data associated with a plurality of employees, the registration data comprising: a plurality of PANs corresponding to the plurality of employees; generating, with at least one processor, a plurality of tokens corresponding to the plurality of PANs; and transmitting, with at least one processor, the plurality of tokens in association with the plurality of PANs to a transaction service provider system.

Clause 15: A computer program product comprising at least one non-transitory computer-readable medium including one or more instructions that, when executed by at least one processor, cause the at least one processor to: in response to receiving an authorization request message comprising transaction data associated with a payment transaction and a primary account number (PAN), identify a token corresponding to the PAN; transmit a request message comprising at least a portion of the transaction data associated with the payment transaction and the token to at least one employer system, wherein the at least one employer system is associated with at least one employer institution; and wherein the request message is configured to cause the at least one employer system to: compare, at the at least one employer system, one or more applicable adjustments to the payment transaction and the token; determine, at the at least one employer system, an adjustment to the payment transaction based on comparing the one or more applicable adjustments to the payment transaction and the token; and generate, at the at least one employer system, the transaction adjustment data associated with the adjustment to the payment transaction, and in response to receiving, from the at least one employer system, at least one response message comprising transaction adjustment data associated with an adjustment to the payment transaction, adjust at least one parameter of the payment transaction based at least partially on the transaction adjustment data.

Clause 16: The system of clause 15, wherein the one or more instructions further cause the at least one processor to: determine at least one identifier for at least one item involved in the payment transaction based on the transaction data associated with the payment transaction, wherein, when transmitting the request message comprising at least a portion of the transaction data associated with the payment transaction and the token to at least one employer system, the at least one processor is programmed or configured to: transmit the request message comprising at least a portion of the transaction data associated with the payment transaction, the token, and the at least one identifier for the at least one item to the at least one employer system.

Clause 17: The system of clauses 15 or 16, wherein the one or more instructions further cause the at least one processor to: compare, by the at least one employer system, the at least one identifier for the at least one item to a plurality of predetermined identifiers associated with a plurality of predetermined items; determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message comprising the transaction adjustment data associated with the adjustment to the payment transaction based on the at least one predetermined identifier associated with the predetermined item.

Clause 18: The system of any of clauses 15-17, wherein the at least one response message comprises a plurality of response messages, and wherein the one or more instructions further cause the at least one processor to: compare the transaction adjustment data in each of the plurality of response messages to the transaction adjustment data in each of the other response messages of the plurality of response messages; and select a response message of the plurality of response messages based on comparing the transaction adjustment data in each of the plurality of response messages to the transaction adjustment data in each of the other response messages of the plurality of response messages, wherein, when adjusting the at least one parameter of the payment transaction based at least partially on the transaction adjustment data, the at least one processor is programmed or configured to: adjust the at least one parameter of the payment transaction based at least partially on the transaction adjustment data of the response message that was selected from the plurality of response messages.

Clause 19: The system of any of clauses 15-18, wherein the one or more instructions that cause the at least one processor to select the response message of the plurality of response messages based on comparing the transaction adjustment data in each of the plurality of response messages to the transaction adjustment data in each of the other response messages of the plurality of response messages cause the at least one processor to: determine that the response message selected from the plurality of response messages includes transaction adjustment data associated with the adjustment to the payment transaction that is greater than the transaction adjustment data associated with the adjustment to the payment transaction of the other response messages of the plurality of response messages.

Clause 20: The system of any of clauses 15-19, wherein the one or more instructions further cause the at least one processor to: receive, by the at least one employer system, registration data associated with a plurality of employees, the registration data comprising: a plurality of PANs corresponding to the plurality of employees; generate, by the at least one employer system, a plurality of tokens corresponding to the plurality of PANs; and transmit, by the at least one employer system, the plurality of tokens in association with the plurality of PANs to a transaction service provider system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4E are diagrams of implementations of some non-limiting embodiments or aspects of a process for linking accounts across systems.

DESCRIPTION

Figure 1:
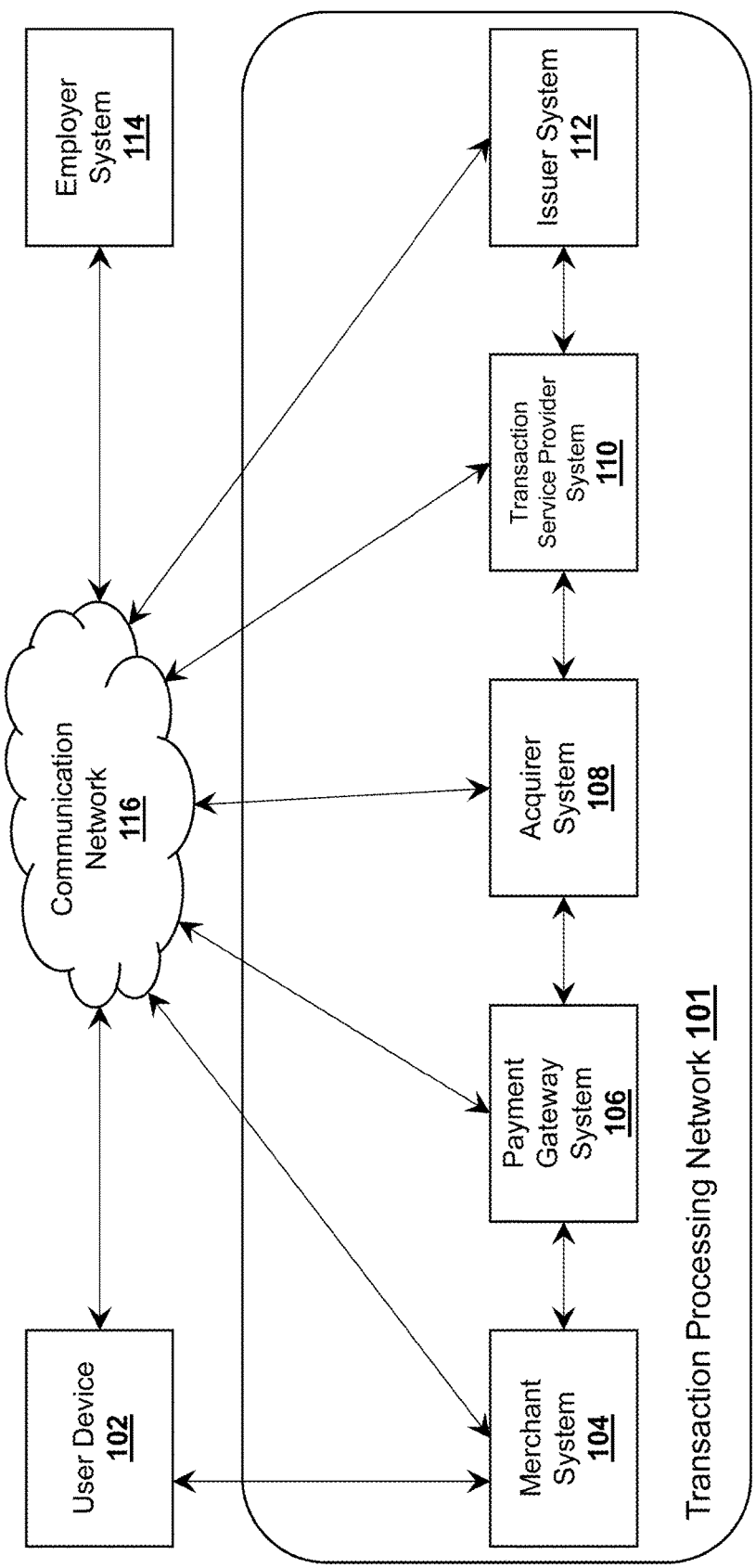
FIG. 1 is a diagram of some non-limiting embodiments or aspects of a system for linking accounts across systems.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for linking accounts across systems. In some non-limiting embodiments or aspects, systems, methods, and computer program products may include receiving, with at least one processor, an authorization request message comprising transaction data associated with a payment transaction and a primary account number (PAN); identifying, with at least one processor, a token corresponding to the PAN, transmitting, with at least one processor, a request message comprising at least a portion of the transaction data associated with the payment transaction and the token to at least one employer system, where the at least one employer system is associated with at least one employer institution; and in response to receiving, from the at least one employer system, at least one response message comprising transaction adjustment data associated with an adjustment to the payment transaction, adjusting, with at least one processor, at least one parameter of the payment transaction based at least partially on the transaction adjustment data.

By virtue of implementation of the systems, methods, and computer program products described herein, system resources may be conserved when processing the payment transaction and accuracy may be increased. For example, a system associated with a merchant may transmit and/or receive fewer or no additional messages to verify that the amount due for the payment transaction should be reduced. This, in turn may decrease the amount of network traffic consumed to complete the payment transaction and/or processing time involved with the one or more other systems. Further, by virtue of the elimination of human intervention and, by extension, human error, individuals initiating the above-noted payment transactions may not have to wait an increased amount of time that may be required if the individual providing the input to the system associated with the merchant provided incorrect and/or inaccurate input to the system and/or while the individual providing the input verified the identity of the individual providing the secondary device.

Referring now to FIG. 1, FIG. 1 is a diagram of an example environment 100 in which devices, systems, methods, and/or products described herein may be implemented. As shown in FIG. 1, environment 100 includes transaction processing network 101, user device 102, merchant system 104, payment gateway system 106, acquirer system 108, transaction service provider system 110, issuer system 112, and/or employer system 114. Transaction processing network 101, user device 102, merchant system 104, payment gateway system 106, acquirer system 108, transaction service provider system 110, issuer system 112, and/or employer system 114 may interconnect (e.g., establish a connection to communicate, and/or the like) via wired connections, wireless connections, or a combination of wired and wireless connections.

User device 102 may include one or more devices configured to be in communication with merchant system 104, payment gateway system 106, acquirer system 108, transaction service provider system 110, issuer system 112, and/or employer system 114 via communication network 116. For example, user device 102 may include a payment device, a smartphone, a tablet, a laptop computer, a desktop computer and/or the like. In some non-limiting embodiments or aspects, user device 102 may be configured to transmit and/or receive data to and/or from merchant system 104 via an imaging system and/or a short-range wireless communication connection (e.g., an NFC communication connection, an RFID communication connection, a Bluetooth® communication connection, and/or the like). In some non-limiting embodiments or aspects, user device 102 may be associated with a user (e.g., an individual operating a device).

Merchant system 104 may include one or more devices configured to be in communication with user device 102, payment gateway system 106, acquirer system 108, transaction service provider system 110, issuer system 112, and/or employer system 114 via communication network 116. For example, merchant system 104 may include one or more servers, one or more groups of servers, one or more client devices, one or more groups of client devices, and/or the like. In some non-limiting embodiments or aspects, merchant system 104 may include a point-of-sale (POS) device. In some non-limiting embodiments or aspects, merchant system 104 may be associated with a merchant as described herein.

Payment gateway system 106 may include one or more devices configured to be in communication with user device 102, merchant system 104, acquirer system 108, transaction service provider system 110, issuer system 112, and/or employer system 114 via communication network 116. For example, payment gateway system 106 may include one or more servers, one or more groups of servers, and/or the like. In some non-limiting embodiments or aspects, payment gateway system 106 may be associated with a payment gateway as described herein.

Acquirer system 108 may include one or more devices configured to be in communication with user device 102, merchant system 104, payment gateway system 106, transaction service provider system 110, issuer system 112, and/or employer system 114 via communication network 116. For example, acquirer system 108 may include one or more servers, one or more groups of servers, and/or other the like. In some non-limiting embodiments or aspects, acquirer system 108 may be associated with an acquirer as described herein.

Transaction service provider system 110 may include one or more devices configured to be in communication with user device 102, merchant system 104, payment gateway system 106, acquirer system 108, issuer system 112, and/or employer system 114 via communication network 116. For example, transaction service provider system 110 may include one or more servers (e.g., transaction processing servers), one or more groups of servers, and/or the like. In some non-limiting embodiments or aspects, transaction service provider system 110 may be associated with a transaction service provider as described herein.

Issuer system 112 may include one or more devices configured to be in communication with user device 102, merchant system 104, payment gateway system 106, acquirer system 108, transaction service provider system 110, and/or employer system 114 via communication network 116. For example, issuer system 112 may include one or more servers, one or more groups of servers, and/or the like. In some non-limiting embodiments or aspects, issuer system 112 may be associated with an issuer institution, as described herein, that issued a payment account and/or instrument (e.g., a credit account, a debit account, a credit card, a debit card, and/or the like) to a user (e.g., a user associated with user device 102 and/or the like).

Employer system 114 may include one or more device configured to be in communication with user device 102, merchant system 104, payment gateway system 106, acquirer system 108, transaction service provider system 110, and/or issuer system 112 via communication network 116. For example, employer system 114 may include one or more servers, one or more groups of servers, and/or the like. In some non-limiting embodiments or aspects, employer system 114 may be associated with an employer institution that employs one or more employees (e.g., one or more individuals, one or more individuals including one or more users associated with user device 102, and/or the like). In some non-limiting embodiments or aspects, employer system 114 may be associated with a plurality of employer institutions that each employ one or more employees. For example, employer system 114 may maintain data associated with a plurality of employees, each employee employed by at least one employer institution of the plurality of employer institutions.

In some non-limiting embodiments or aspects, transaction processing network 101 may include a plurality of systems in a communication path for processing a transaction. For example, transaction processing network 101 may include merchant system 104, payment gateway system 106, acquirer system 108, transaction service provider system 110, and/or issuer system 112 in a communication path (e.g., a communication path, a communication channel, a communication network, and/or the like). As an example, transaction processing network 101 may process (e.g., initiate, conduct, authorize, and/or the like) an electronic payment transaction via the communication path between merchant system 104, payment gateway system 106, acquirer system 108, transaction service provider system 110, and/or issuer system 112.

Communication network 116 may include one or more wired and/or wireless networks. For example, communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
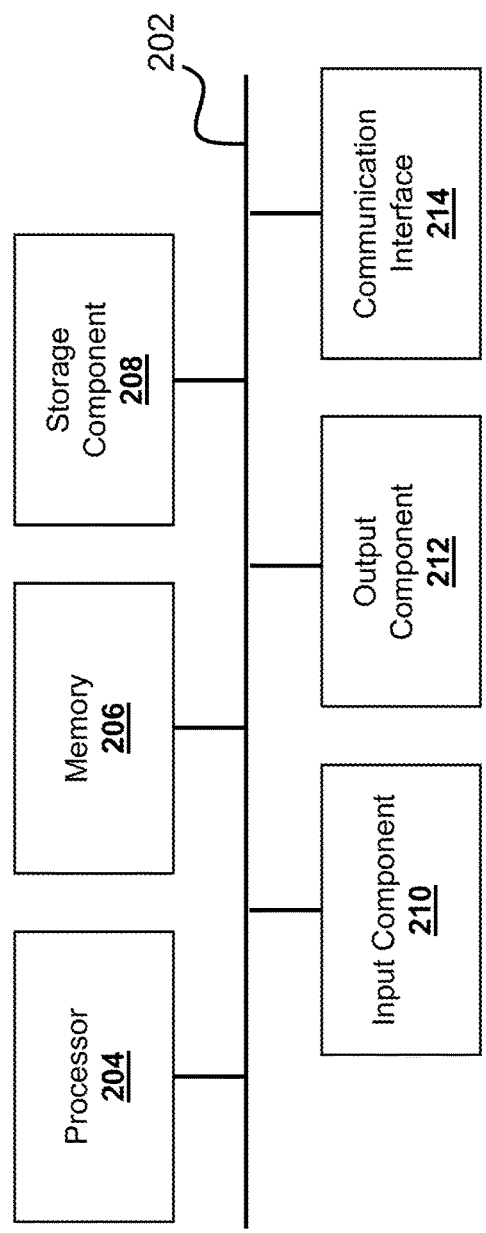
FIG. 2 is a diagram of some non-limiting embodiments or aspects of components of one or more devices and/or one or more systems of FIG. 1.

Referring now to FIG. 2, FIG. 2 is a diagram of example components of device 200. Device 200 may correspond to one or more devices of transaction processing network 101, one or more devices of user device 102 (e.g., one or more devices of a system of user device 102), one or more devices of merchant system 104 (e.g., one or more devices of a system of merchant system 104), one or more devices of payment gateway system 106 (e.g., one or more devices of a system of payment gateway system 106), one or more devices of acquirer system 108 (e.g., one or more devices of a system of acquirer system 108), one or more devices of transaction service provider system 110 (e.g., one or more devices of a system of transaction service provider system 110), one or more devices of issuer system 112 (e.g., one or more devices of a system of issuer system 112), one or more devices of employer system 114 (e.g., one or more devices of a system of employer system 114), and/or one or more devices of the communication network 116 (e.g., one or more devices of a system of communication network 116). In some non-limiting embodiments or aspects, one or more devices of user device 102, one or more devices of merchant system 104, one or more devices of payment gateway system 106, one or more devices of acquirer system 108, one or more devices of transaction service provider system 110, one or more devices of issuer system 112, one or more devices of employer system 114, and/or one or more devices of the communication network 116 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include transaction data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
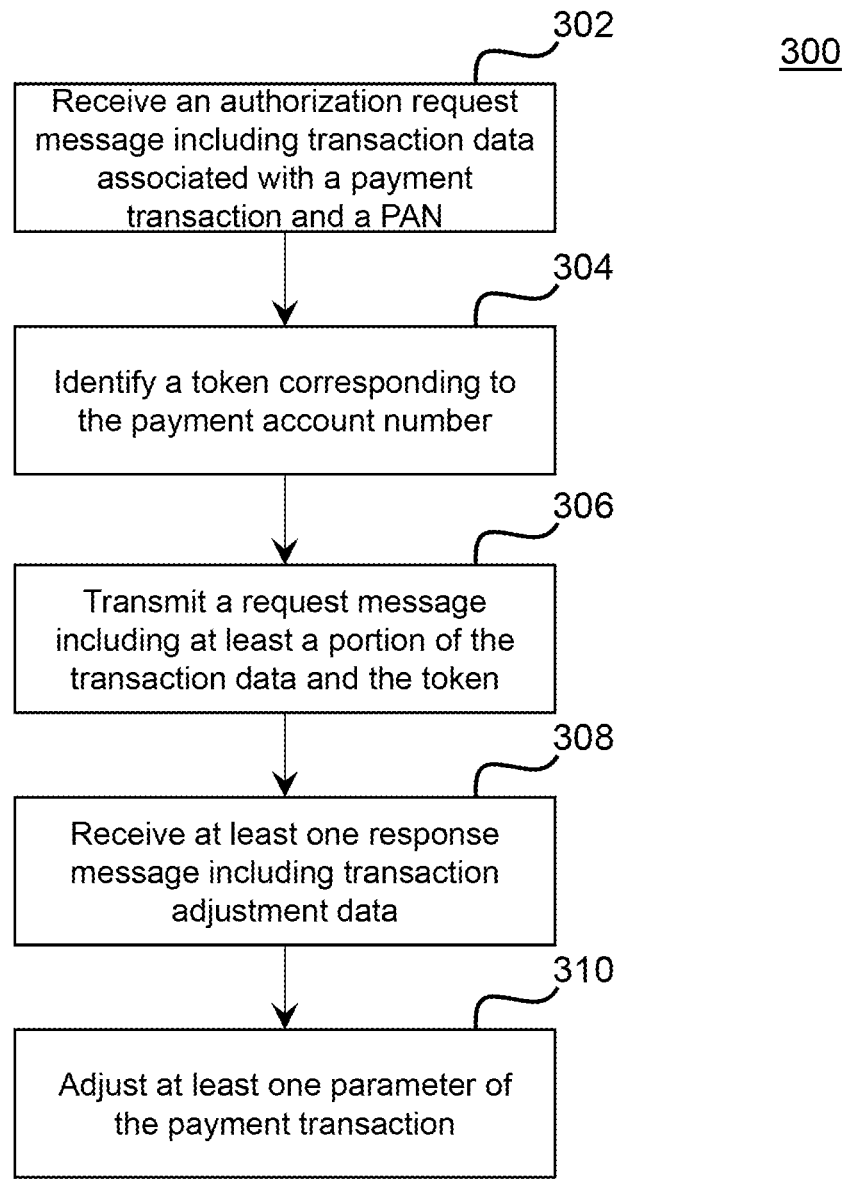
FIG. 3 is a flowchart of some non-limiting embodiments or aspects of a process for linking accounts across systems.

Referring now to FIG. 3, FIG. 3 is a flowchart of a non-limiting embodiment or aspect of a process 300 for linking accounts across systems. In some non-limiting embodiments or aspects, one or more of the functions described with respect to process 300 may be performed (e.g., completely, partially, etc.) by transaction service provider system 110. In some non-limiting embodiments or aspects, one or more of the steps of process 300 may be performed (e.g., completely, partially, and/or the like) by another device or a group of devices separate from and/or including transaction service provider system 110, such as user device 102, merchant system 104, payment gateway system 106, acquirer system 108, issuer system 112, and/or employer system 114.

As shown in FIG. 3, at step 302, process 300 may include receiving an authorization request message including transaction data associated with a payment transaction and a primary account number (PAN). For example, transaction service provider system 110 may receive an authorization request message including transaction data associated with a payment transaction and a PAN. In such an example, transaction service provider system 110 may receive the authorization request message including the transaction data associated with a payment transaction and the PAN from merchant system 104. In some non-limiting embodiments or aspects, merchant system 104 may transmit the authorization request to transaction service provider system 110 based on user device 102 initiating the payment transaction at merchant system 104. In some non-limiting embodiments or aspects, the payment transaction may involve a user associated with user device 102 and a merchant associated with merchant system 104.

In some non-limiting embodiments or aspects, transaction service provider system 110 may determine at least one identifier for at least one item (e.g., a good and/or a service) involved in the payment transaction. For example, transaction service provider system 110 may determine the at least one identifier for the at least one item involved in the payment transaction based on the transaction data associated with the payment transaction. In another example, transaction service provider system 110 may determine the at least one identifier for the at least one item involved in the payment transaction based on item data associated with the at least one item. In such an example, the item data associated with the at least one item may be included in the authorization request message.

As shown in FIG. 3, at step 304, process 300 may include identifying a token corresponding to the PAN. For example, transaction service provider system 110 may identify a token corresponding to the PAN. In some non-limiting embodiments or aspects, transaction service provider system 110 may identify the token corresponding to the PAN based on (e.g., in response to) receiving the authorization request message. For example, transaction service provider system 110 may identify the token corresponding to the PAN based on (e.g., in response to) receiving the authorization request message from merchant system 104. In such an example, transaction service provider system 110 may identify the token corresponding to the PAN based on the data included in the authorization request message. In some non-limiting embodiments or aspects, transaction service provider system 110 may identify the token corresponding to the PAN based on comparing the PAN to data included in a database. For example, transaction service provider system 110 may identify the token corresponding to the PAN based on comparing the PAN to one or more PANs stored in association with (e.g., in correspondence with) one or more tokens in the database. In such an example, transaction service provider system 110 may identify the token corresponding to the PAN based on comparing the PAN to the one or more PANs stored in association with the one or more tokens in the database and transaction service provider system 110 may select the token corresponding to the PAN in the database that matches the PAN of the authorization request message.

In some non-limiting embodiments or aspects, transaction service provider system 110 may maintain the database including the one or more PANs stored in association with the one or more tokens (referred to herein as the PAN-Token database). For example, transaction service provider system 110 may maintain the PAN-Token database based on receiving data associated with one or more PAN-Token associations from one or more employer systems 114. In such an example, the one or more employer systems 114 may generate and/or transmit the data associated with the one or more PAN-Token associations based on receiving registration data associated with a plurality of employees. In some non-limiting embodiments or aspects, employer system 114 may receive the registration data from one or more user devices 102 associated with the one or more employees. For example, employer system 114 may receive the registration data from one or more user devices 102 associated with the one or more employees, the registration data including one or more PANs corresponding to the respective employee of the one or more employees. In some non-limiting embodiments or aspects, employer system 114 may generate a plurality of tokens. For example, employer system 114 may generate a plurality of tokens, where each token corresponds to one or more PANs of the one or more employees. In some non-limiting embodiments or aspects, employer system 114 may transmit data associated with the one or more PAN-Token associations to transaction service provider system 110 based on employer system 114 generating the plurality of tokens.

As shown in FIG. 3, at step 306, process 300 may include transmitting a request message including at least a portion of the transaction data associated with the payment transaction and the token. For example, transaction service provider system 110 may transmit a request message including at least a portion of the transaction data associated with the payment transaction and the token. In such an example, transaction service provider system 110 may transmit the request message including at least a portion of the transaction data associated with the payment transaction and the token to one or more employer systems 114. In some non-limiting embodiments or aspects, transaction service provider system 110 may transmit the request message based on identifying the token corresponding to the PAN. For example, transaction service provider system 110 may transmit the request message based on identifying the token corresponding to the PAN. In such an example, transaction service provider system 110 may transmit the request message based on identifying the token corresponding to the PAN, where transaction service provider system 110 determines that the token corresponding to the PAN is associated with the employer system 114. Additionally or alternatively, transaction service provider system 110 may transmit the request message based on identifying the token corresponding to the PAN to multiple employer systems 114 and transaction service provider system 110 may forego determining that the token is associated with the one or more employer systems 114.

In some non-limiting embodiments or aspects, transaction service provider system 110 may transmit the request message, where the request message comprises at least one identifier for at least one item involved in a payment transaction. For example, transaction service provider system 110 may transmit the request message, where the request message comprises at least one identifier for at least one item involved in a payment transaction based on transaction service provider system 110 determining the at least one identifier for the at least one item involved in the payment transaction. In such an example, transaction service provider system 110 may transmit the request message including the at least one identifier for the at least one item involved in the payment transaction to the one or more employer systems 114.

In some non-limiting embodiments or aspects, at least one employer system 114 may compare one or more applicable adjustments to the payment transaction and the token. For example, the at least one employer system 114 may compare one or more applicable adjustments to the payment transaction and the token based on receiving the request message from transaction service provider system 110. In such an example, the at least one employer system 114 may compare one or more applicable adjustments to the payment transaction and the token based on data included in the request message. Additionally or alternatively, the at least one employer system 114 may compare at least one identifier for at least one item included in the request message to a plurality of predetermined identifiers for a plurality of predetermined items. For example, the at least one employer system 114 may compare the at least one identifier for at least one item included in the request message to a plurality of predetermined identifiers for a plurality of predetermined items. In such an example, the plurality of predetermined items may be associated with the one or more applicable adjustments. In some non-limiting embodiments or aspects, the at least one employer system 114 may determine that the at least one identifier corresponds to at least one predetermined identifier of the plurality of predetermined identifiers.

For example, the at least one employer system 114 may determine that the at least one identifier corresponds to at least one predetermined identifier of the plurality of predetermined identifiers based on the at least one employer system 114 comparing the at least one identifier for the at least one item included in the request message to the plurality of predetermined identifiers associated with the plurality of predetermined items.

In some non-limiting embodiments or aspects, employer system 114 may determine an adjustment to the payment transaction. For example, employer system 114 may determine an adjustment to the payment transaction based on the one or more applicable adjustments to the payment transaction and the token. In such an example, employer system 114 may determine the adjustment to the payment transaction based on employer system 114 comparing the one or more applicable adjustments to the payment transaction and the token and selecting, from among the one or more applicable adjustments, an applicable adjustment to the payment transaction that is greater than the remaining applicable adjustments to the payment transactions (e.g., the applicable adjustment that reduces the value of the transaction greater than the remaining applicable adjustments and/or the like). Additionally or alternatively, the at least one employer system 114 may determine the adjustment to the payment transaction based on employer system 114 determining that the at least one identifier included in the request message corresponds to the at least one predetermined identifier associated with the predetermined item.

In some non-limiting embodiments or aspects, employer system 114 may generate transaction adjustment data associated with an adjustment to the payment transaction. For example, employer system 114 may generate transaction adjustment data associated with an adjustment to the payment transaction based on employer system 114 determining an adjustment to the payment transaction. Additionally or alternatively, employer system 114 may generate the transaction adjustment data associated with the adjustment to the payment transaction based on determining the adjustment to the payment transaction, where employer system 114 determined that the at least one identifier included in the request message corresponds to the at least one predetermined identifier associated with the predetermined item.

In some non-limiting embodiments or aspects, the at least one employer system 114 may transmit at least one response message. For example, the at least one employer system 114 may transmit the at least one response message to transaction service provider system 110. In such an example, the at least one employer system 114 may transmit the at least one response message to transaction service provider system 110, where the at least one response message includes transaction adjustment data associated with the adjustment to the payment transaction.

As shown in FIG. 3, at step 308, process 300 may include receiving at least one response message including transaction adjustment data. For example, transaction service provider system 110 may receive at least one response message including transaction adjustment data associated with an adjustment to the payment transaction. In such an example, transaction service provider system 110 may receive the at least one response message from one or more employer systems 114 based on transaction service provider system 110 transmitting the request message to the one or more employer systems 114.

As shown in FIG. 3, at step 310, process 300 may include adjusting at least one parameter of the payment transaction. For example, transaction service provider system 110 may adjust at least one parameter of the payment transaction. In such an example, transaction service provider system 110 may adjust the at least one parameter of the payment transaction based on transaction service provider system 110 receiving one or more response messages from one or more employer systems 114. In some non-limiting embodiments or aspects, transaction service provider system 110 may adjust the at least one parameter of the payment transaction based at least partially on transaction adjustment data associated with an adjustment to the payment transaction included in one or more response messages.

In some non-limiting embodiments or aspects, transaction service provider system 110 may compare transaction adjustment data included in one or more response messages to transaction adjustment data included in each of the other response messages of the plurality of response messages. For example, transaction service provider system 110 may compare transaction adjustment data included in one or more response messages to transaction adjustment data included in each of the other response messages of the plurality of response messages based on transaction service provider system 110 comparing the adjustment to the payment transaction of the response message to the adjustment to the payment transaction of each of the other response messages of the plurality of response messages. In some non-limiting embodiments or aspects, transaction service provider system 110 may select a response message of the plurality of response messages. For example, transaction service provider system 110 may select a response message of the plurality of response messages based on comparing the transaction adjustment data in each of the plurality of response messages to the transaction adjustment data in each of the other response messages of the plurality of response messages. In some non-limiting embodiments or aspects, transaction service provider system 110 may select the response message from the plurality of response messages based on transaction service provider system 110 determining that the selected response message is associated with an adjustment to the payment transaction that is greater than adjustments to the payment transaction of the other response messages of the plurality of response messages. In some non-limiting embodiments or aspects, transaction service provider system 110 may adjust the at least one parameter of the payment transaction based on transaction service provider system 110 selecting the response message. For example, transaction service provider system 110 may adjust the at least one parameter of the payment transaction based on data included in the response messages selected by transaction service provider system 110 from the plurality of response messages.

Referring now to FIGS. 4A-4E, FIGS. 4A-4E are flowcharts of a non-limiting embodiment or aspect of an implementation 400 relating to a process for linking accounts across systems. As illustrated in FIGS. 4A-4E, implementation 400 may include user device 402, merchant system 404, transaction service provider system 410, and/or employer system 414. In some non-limiting embodiments or aspects, user device 402 may be the same as or similar to user device 102. In some non-limiting embodiments or aspects, merchant system 404 may be the same as or similar to merchant system 104. In some non-limiting embodiments or aspects, transaction service provider system 410 may be the same as or similar to transaction service provider system 110. In some non-limiting embodiments or aspects, employer system 414 may be the same as or similar to employer system 114.

Figure 4A:
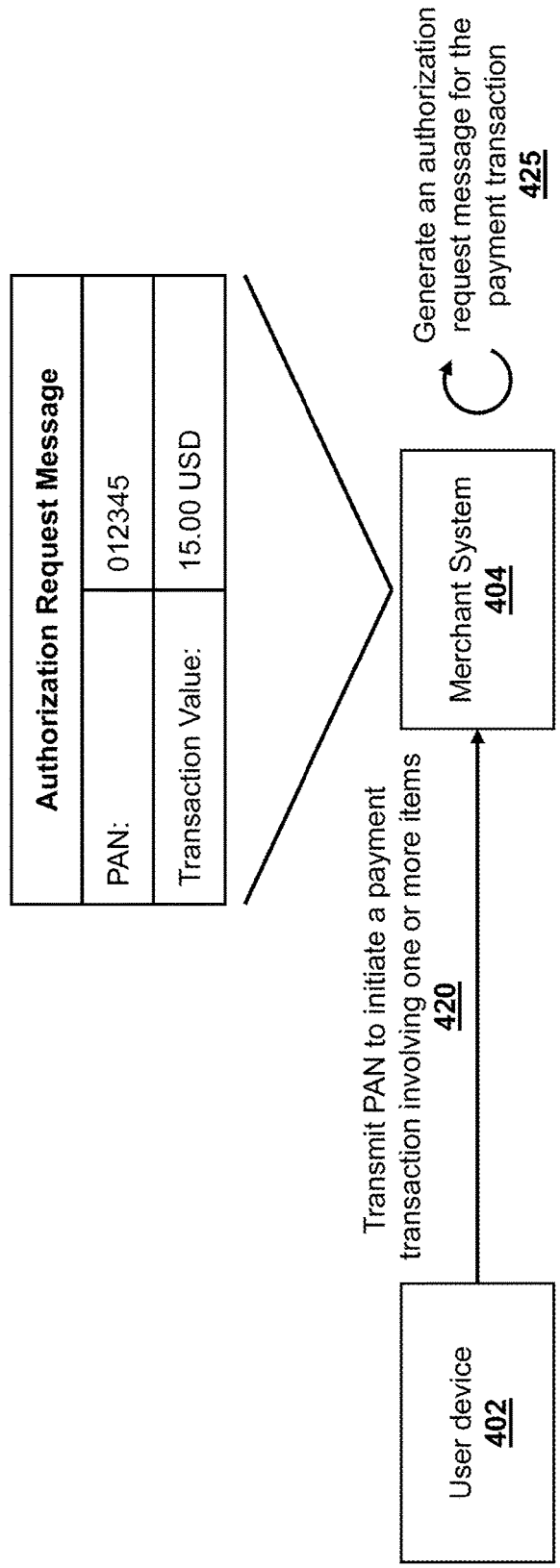

As shown by reference number 420 in FIG. 4A, user device 402 may transmit a PAN to initiate a payment transaction involving one or more items to merchant system 404. For example, user device 402 may transmit a PAN to initiate a payment transaction involving one or more items to merchant system 404 at a POS terminal associated with merchant system 404. In such an example, the POS terminal may receive as input at least one identifier for at least one item involved in the payment transaction (e.g., via scanning a barcode affixed to the at least one item).

As shown by reference number 425 in FIG. 4A, merchant system 404 may generate an authorization request message for the payment transaction. For example, merchant system 404 may generate an authorization request message for the payment transaction based on receiving the PAN from user device 402. The authorization request message may include transaction data associated with a payment transaction, the transaction data including data associated with one or more parameters (e.g., a value associated with one or more items involved in the payment transaction, a time at which the payment transaction is initiated, and/or the like) of the payment transaction. Additionally or alternatively, the authorization request message may include the PAN transmitted by user device 402 to merchant system 404.

Figure 4B:
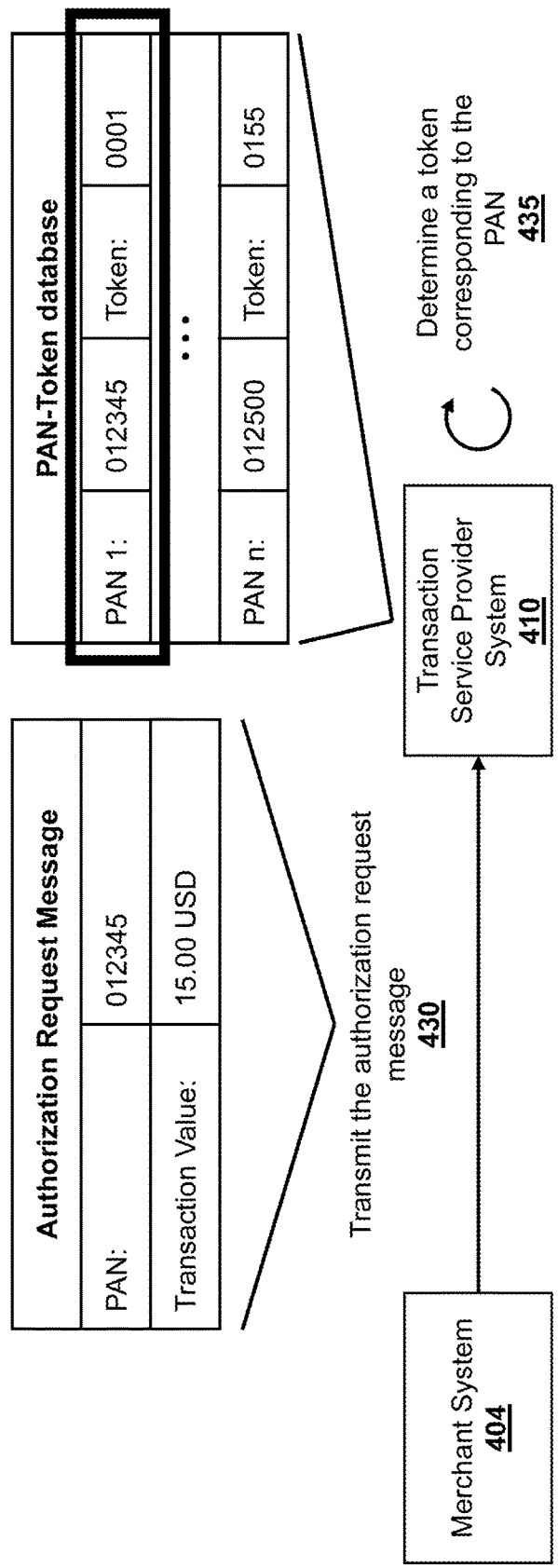

As shown by reference number 430 in FIG. 4B, merchant system 404 may transmit the authorization request message to transaction service provider system 410. As shown by reference number 435 in FIG. 4B, transaction service provider system 410 may determine a token corresponding to the PAN. For example, transaction service provider system 410 may determine the token corresponding to the PAN based on transaction service provider system 410 comparing the PAN to one or more PANs included in the PAN-Token database. In such an example, transaction service provider system 410 may select the token corresponding to the PAN included in the PAN-Token database that matches the PAN included in the authorization request message. In some non-limiting embodiments or aspects, the PAN-Token database may be associated with a token service and/or a network credential linked employee benefit system. In some non-limiting embodiments or aspects, the PAN-Token database may be configured to communicate with employer system 414.

As shown by reference number 440 in FIG. 4C, transaction service provider system 410 may generate a request message including the token. In some non-limiting embodiments or aspects, transaction service provider system 410 may generate a request message including the token and at least a portion of the transaction data associated with the payment transaction. As shown by reference number 445 in FIG. 4C, transaction service provider system 410 may transmit the request message to employer system 414. In some non-limiting embodiments or aspects, employer system 414 may include the PAN-Token database, described herein.

As shown by reference number 450 in FIG. 4D, employer system 414 may determine transaction adjustment data based on the token. For example, employer system 414 may determine transaction adjustment data associated with an adjustment to the payment transaction based on the token included in the request message.

As shown by reference number 455 in FIG. 4D, employer system 414 may transmit a response message including the transaction adjustment data to transaction service provider system 410. The transaction adjustment data may include an indication to adjust the transaction (e.g., a "YES" or "NO") in accordance with one or more rules (e.g., one or more rules pre-established with the transaction service provider system 410). Additionally or alternatively, the transaction adjustment data may include an adjustment to the payment transaction (e.g., instructions to reduce the transaction value by a percent, an updated transaction value adjusted by the employer system 414, and/or the like). In some non-limiting embodiments or aspects, the transaction adjustment data may include a plurality of adjustments. For example, the transaction adjustment data may be associated with a plurality of adjustments to the payment transaction. In some non-limiting embodiments or aspects, the plurality of adjustments may be tiered (e.g., may be ordered in a sequence in which they should be used to adjust the payment transaction and/or the like). For example, the plurality of adjustments may be tiered and transaction service provider system 410 may adjust the payment transaction based on the tiered plurality of adjustments.

Figure 4E:
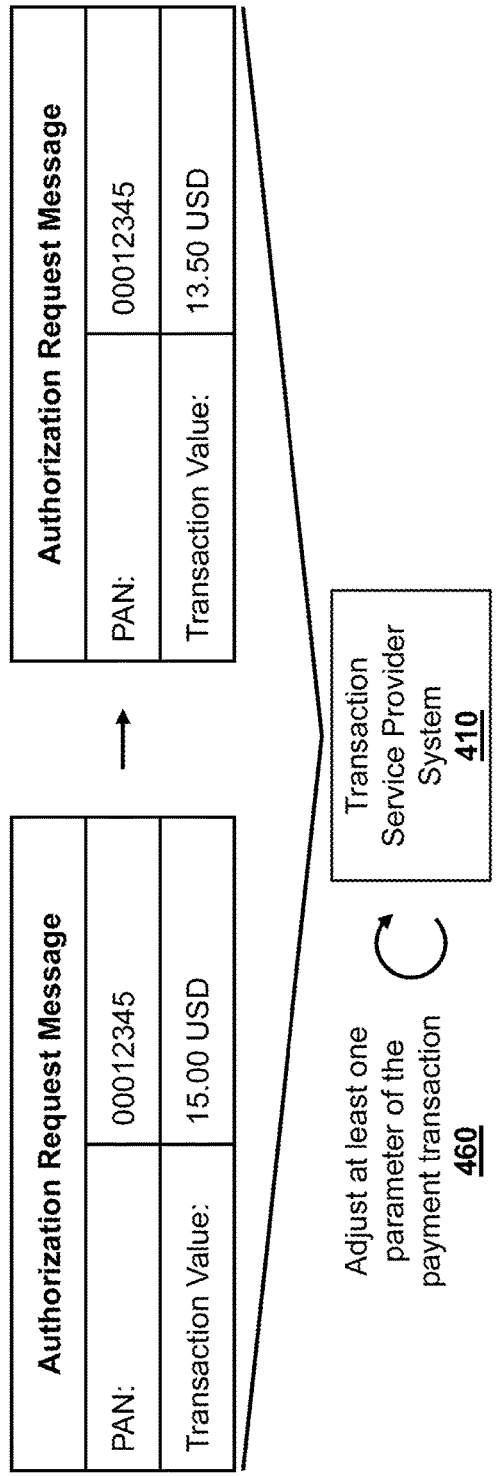

As shown by reference number 460 in FIG. 4E, transaction service provider system 410 may adjust at least one parameter of the payment transaction. For example, transaction service provider system 410 may adjust at least one parameter of the payment transaction (e.g., the transaction value of the payment transaction) based on the transaction adjustment data associated with the adjustment to the payment transaction included in the response message (e.g., by reducing the transaction value by 10% from 15 USD to 13.50 USD). In some non-limiting embodiments or aspects, transaction service provider system 410 may then transmit the authorization request message after adjusting the payment transaction to one or more systems to process the payment transaction. For example, transaction service provider system 410 may transmit the authorization request message after adjusting the payment transaction to an issuer system associated with the PAN. The issuer system may then transmit an authorization response message including an indication of whether the payment transaction is approved or not approved (e.g., declined). In some non-limiting embodiments or aspects, the transaction service provider system 410 may transmit the authorization response message to merchant system 404 to cause merchant system 404 to output a display indicating whether the payment transaction is approved or not approved.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising:
   at least one processor programmed or configured to:
   receive, with a transaction service provider system, from at least one employer system, a plurality of tokens in association with a plurality of primary account numbers (PANs);
   before receiving an authorization request message comprising transaction data associated with a payment transaction and a PAN, store, with the transaction service provider system, in a database, the plurality of tokens in association with the plurality of PANs;

receive, with the transaction service provider system, from a merchant system, the authorization request message comprising the transaction data associated with the payment transaction and the PAN;

in response to receiving, with the transaction service provider system, from a merchant system, the authorization request message comprising the transaction data associated with the payment transaction and the PAN, identify, with the transaction service provider system, using the plurality of tokens stored in the database in association with the plurality of PANs, a token corresponding to the PAN, wherein the token uniquely identifies a same account as the PAN;

transmit, with the transaction service provider system, a request message comprising at least a portion of the transaction data associated with the payment transaction and the token to the at least one employer system, wherein the at least one employer system is associated with at least one employer institution;

in response to receiving, with the transaction service provider system, from the at least one employer system, at least one response message comprising transaction adjustment data associated with an adjustment to the payment transaction, adjust, with the transaction service provider system, at least one parameter of the payment transaction based at least partially on the transaction adjustment data, wherein the at least one parameter of the payment transaction includes a transaction value of the payment transaction, wherein the transaction adjustment data includes a plurality of tiered adjustments to the payment transaction ordered in a sequence in which the plurality of tiered adjustments is to be used to adjust the payment transaction, and wherein the transaction service provider system adjusts the at least one parameter of the payment transaction based on the plurality of tiered adjustments according to the order of the sequence;

after adjusting, with the transaction service provider system, the at least one parameter of the payment transaction based at least partially on the transaction adjustment data, transmit, with the transaction service provider system, to an issuer system associated with the PAN, the authorization request message with an adjusted transaction value of the payment transaction and the PAN; and receive, with the transaction service provider system, from the issuer system, an authorization response message including an indication of whether the payment transaction including the adjusted transaction value is approved or declined.

2. The system of claim 1, wherein the at least one processor is further programmed or configured to:

compare, at the at least one employer system, one or more applicable adjustments to the payment transaction and the token;

determine, at the at least one employer system, an adjustment to the payment transaction based on comparing the one or more applicable adjustments to the payment transaction and the token; and generate, at the at least one employer system, the transaction adjustment data associated with the adjustment to the payment transaction.

3. The system of claim 1, wherein the at least one processor is further programmed or configured to:

determine, with the transaction service provider system, at least one identifier for at least one item involved in the payment transaction based on the transaction data associated with the payment transaction, wherein, when transmitting, with the transaction service provider system, the request message comprising at least a portion of the transaction data associated with the payment transaction and the token to at least one employer system, the at least one processor is programmed or configured to:

transmit, with the transaction service provider system, the request message comprising at least a portion of the transaction data associated with the payment transaction, the token, and the at least one identifier for the at least one item to the at least one employer system.

4. The system of claim 3, wherein the at least one processor is further programmed or configured to:

compare, by the at least one employer system, the at least one identifier for the at least one item to a plurality of predetermined identifiers associated with a plurality of predetermined items;

determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message comprising the transaction adjustment data associated with the adjustment to the payment transaction based on the at least one predetermined identifier associated with the predetermined item.

5. The system of claim 1, wherein the at least one response message comprises a plurality of response messages, and wherein the at least one processor is further programmed or configured to:

compare, with the transaction service provider system, the transaction adjustment data in each of the plurality of response messages to the transaction adjustment data in each of the other response messages of the plurality of response messages; and select, with the transaction service provider system, a response message of the plurality of response messages based on comparing the transaction adjustment data in each of the plurality of response messages to the transaction adjustment data in each of the other response messages of the plurality of response messages, wherein, when adjusting, with the transaction service provider system, the at least one parameter of the payment transaction based at least partially on the transaction adjustment data, the at least one processor is programmed or configured to:

adjust, with the transaction service provider system, the at least one parameter of the payment transaction based at least partially on the transaction adjustment data of the response message that was selected from the plurality of response messages.

6. The system of claim 5, wherein, when selecting, with the transaction service provider system, the response message of the plurality of response messages based on comparing the transaction adjustment data in each of the plurality of response messages to the transaction adjustment data in each of the other response messages of the plurality of response messages, the at least one processor is programmed or configured to:
  determine, with the transaction service provider system, that the response message selected from the plurality of response messages includes transaction adjustment data associated with the adjustment to the payment transaction that is greater than the transaction adjustment data associated with the adjustment to the payment transaction of the other response messages of the plurality of response messages.

7. A computer-implemented method, comprising:
  receiving, with at least one processor of a transaction service provider system, from at least one employer system, a plurality of tokens in association with a plurality of primary account numbers (PANs);
  before receiving an authorization request message comprising transaction data associated with a payment transaction and a PAN, storing, with the at least one processor of the transaction service provider system, in a database, the plurality of tokens in association with the plurality of PANs;
  receiving, with the at least one processor of the transaction service provider system, from a merchant system, the authorization request message comprising the transaction data associated with the payment transaction and the PAN;
  identifying, with the at least one processor of the transaction service provider system, a token corresponding to the PAN, wherein the token uniquely identifies a same account as the PAN;
  transmitting, with the at least one processor of the transaction service provider system, a request message comprising at least a portion of the transaction data associated with the payment transaction and the token to the at least one employer system, wherein the at least one employer system is associated with at least one employer institution;
  in response to receiving, from the at least one employer system, at least one response message comprising transaction adjustment data associated with an adjustment to the payment transaction, adjusting, with the at least one processor of the transaction service provider system, at least one parameter of the payment transaction based at least partially on the transaction adjustment data, wherein the at least one parameter of the payment transaction includes a transaction value of the payment transaction,
  wherein the transaction adjustment data includes a plurality of tiered adjustments to the payment transaction ordered in a sequence in which the plurality of tiered adjustments is to be used to adjust the payment transaction, and wherein the transaction service provider system adjusts the at least one parameter of the payment transaction based on the plurality of tiered adjustments according to the order of the sequence;
  after adjusting the at least one parameter of the payment transaction based at least partially on the transaction adjustment data, transmitting, with the at least one processor of the transaction service provider system, to an issuer system associated with the PAN, the authorization request message with an adjusted transaction value of the payment transaction and the PAN; and
  receiving, with the at least one processor of the transaction service provider system, from the issuer system, an authorization response message including an indication of whether the payment transaction including the adjusted transaction value is approved or declined.

8. The computer-implemented method of claim 7, further comprising:
  comparing, with one or more processors at the at least one employer system, one or more applicable adjustments to the payment transaction and the token;
  determining, with the one or more processors at the at least one employer system, an adjustment to the payment transaction based on comparing the one or more applicable adjustments to the payment transaction and the token; and
  generating, with the one or more processors at the at least one employer system, the transaction adjustment data associated with the adjustment to the payment transaction.

9. The computer-implemented method of claim 7, further comprising:
  determining, with the at least one processor of the transaction service provider system, at least one identifier for at least one item involved in the payment transaction based on the transaction data associated with the payment transaction,
  wherein transmitting, the request message comprising at least a portion of the transaction data associated with the payment transaction and the token to at least one employer system comprises:
    transmitting, with the at least one processor of the transaction service provider system, the request message comprising at least a portion of the transaction data associated with the payment transaction, the token, and the at least one identifier for the at least one item to the at least one employer system.

10. The computer-implemented method of claim 9, further comprising:
  comparing, with one or more processors at the at least one employer system, the at least one identifier for the at least one item to a plurality of predetermined identifiers associated with a plurality of predetermined items;
  determining, with the one or more processors at the at least one employer system, that the at least one identifier corresponds to at least one predetermined identifier associated with a predetermined item based on comparing the at least one identifier for the at least one item to the plurality of predetermined identifiers associated with the plurality of predetermined items; and
  transmitting, with the one or more processors at the at least one employer system, the at least one response message comprising the transaction adjustment data associated with the adjustment to the payment transaction based on the at least one predetermined identifier associated with the predetermined item.

11. The computer-implemented method of claim 7, wherein the at least one response message comprises a plurality of response messages, and wherein the computer-implemented method further comprises:
  comparing, with the at least one processor of the transaction service provider system, the transaction adjustment data in each of the plurality of response messages to the transaction adjustment data in each of the other response messages of the plurality of response messages; and
  selecting, with the at least one processor of the transaction service provider system, a response message of the plurality of response messages based on comparing the transaction adjustment data in each of the plurality of response messages to the transaction adjustment data in each of the other response messages of the plurality of response messages, wherein adjusting the at least one parameter of the payment transaction based at least partially on the transaction adjustment data comprises:

adjusting, with the at least one processor of the transaction service provider system, the at least one parameter of the payment transaction based at least partially on the transaction adjustment data of the response message that was selected from the plurality of response messages.

12. The computer-implemented method of claim 11, wherein selecting the response message of the plurality of response messages based on comparing the transaction adjustment data in each of the plurality of response messages to the transaction adjustment data in each of the other response messages of the plurality of response messages comprises:

determining, with the at least one processor of the transaction service provider system, that the response message selected from the plurality of response messages includes transaction adjustment data associated with the adjustment to the payment transaction that is greater than the transaction adjustment data associated with the adjustment to the payment transaction of the other response messages of the plurality of response messages.

13. A computer program product comprising at least one non-transitory computer-readable medium including one or more instructions that, when executed by at least one processor, cause the at least one processor to:

receive, with a transaction service provider system, from at least one employer system, a plurality of tokens in association with a plurality of primary account numbers (PANs);

before receiving an authorization request message comprising transaction data associated with a payment transaction and a PAN, store, with the transaction service provider system, in a database, the plurality of tokens in association with the plurality of PANs;

receive, with the transaction service provider system, from a merchant system, the authorization request message comprising the transaction data associated with the payment transaction and the PAN;

in response to receiving, with the transaction service provider system, from a merchant system, the authorization request message comprising the transaction data associated with the payment transaction and the PAN, identify, with the transaction service provider system, using the plurality of tokens stored in the database in association with the plurality of PANs, a token corresponding to the PAN, wherein the token uniquely identifies a same account as the PAN;

transmit, with the transaction service provider system, a request message comprising at least a portion of the transaction data associated with the payment transaction and the token to the at least one employer system, wherein the at least one employer system is associated with at least one employer institution; and wherein the request message is configured to cause the at least one employer system to:

compare, at the at least one employer system, one or more applicable adjustments to the payment transaction and the token;

determine, at the at least one employer system, an adjustment to the payment transaction based on comparing the one or more applicable adjustments to the payment transaction and the token; and generate, at the at least one employer system, transaction adjustment data associated with the adjustment to the payment transaction, in response to receiving, with the transaction service provider system, from the at least one employer system, at least one response message comprising transaction adjustment data associated with an adjustment to the payment transaction, adjust at least one parameter of the payment transaction based at least partially on the transaction adjustment data, wherein the at least one parameter of the payment transaction includes a transaction value of the payment transaction, wherein the transaction adjustment data includes a plurality of tiered adjustments to the payment transaction ordered in a sequence in which the plurality of tiered adjustments is to be used to adjust the payment transaction, and wherein the transaction service provider system adjusts the at least one parameter of the payment transaction based on the plurality of tiered adjustments according to the order of the sequence;

after adjusting, with the transaction service provider system, the at least one parameter of the payment transaction based at least partially on the transaction adjustment data, transmit, with the transaction service provider system, to an issuer system associated with the PAN, the authorization request message with an adjusted transaction value of the payment transaction and the PAN; and receive, with the transaction service provider system, from the issuer system, an authorization response message including an indication of whether the payment transaction including the adjusted transaction value is approved or declined.

14. The computer program product of claim 13, wherein the one or more instructions further cause the at least one processor to:

determine, with the transaction service provider system, at least one identifier for at least one item involved in the payment transaction based on the transaction data associated with the payment transaction, wherein, when transmitting, with the transaction service provider system, the request message comprising at least a portion of the transaction data associated with the payment transaction and the token to at least one employer system, the at least one processor is programmed or configured to:

transmit, with the transaction service provider system, the request message comprising at least a portion of the transaction data associated with the payment transaction, the token, and the at least one identifier for the at least one item to the at least one employer system.

15. The computer program product of claim 14, wherein the one or more instructions further cause the at least one processor to:

compare, by the at least one employer system, the at least one identifier for the at least one item to a plurality of predetermined identifiers associated with a plurality of predetermined items;

determine, by the at least one employer system, that the at least one identifier corresponds to at least one predetermined identifier associated with a predetermined item based on comparing the at least one identifier for the at least one item to the plurality of predetermined identifiers associated with the plurality of predetermined items; and transmit, by the at least one employer system, the at least one response message comprising the transaction adjustment data associated with the adjustment to the payment transaction based on the at least one predetermined identifier associated with the predetermined item.

16. The computer program product of claim 13, wherein the at least one response message comprises a plurality of response messages, and wherein the one or more instructions further cause the at least one processor to:
compare, with the transaction service provider system, the transaction adjustment data in each of the plurality of response messages to the transaction adjustment data in each of the other response messages of the plurality of response messages; and
select, with the transaction service provider system, a response message of the plurality of response messages based on comparing the transaction adjustment data in each of the plurality of response messages to the transaction adjustment data in each of the other response messages of the plurality of response messages, wherein, when adjusting, with the transaction service provider system, the at least one parameter of the payment transaction based at least partially on the transaction adjustment data, the at least one processor is programmed or configured to:
adjust, with the transaction service provider system, the at least one parameter of the payment transaction based at least partially on the transaction adjustment data of the response message that was selected from the plurality of response messages.

17. The computer program product of claim 16, wherein the one or more instructions that cause the at least one processor to select the response message of the plurality of response messages based on comparing the transaction adjustment data in each of the plurality of response messages to the transaction adjustment data in each of the other response messages of the plurality of response messages cause the at least one processor to:
determine, with the transaction service provider system, that the response message selected from the plurality of response messages includes transaction adjustment data associated with the adjustment to the payment transaction that is greater than the transaction adjustment data associated with the adjustment to the payment transaction of the other response messages of the plurality of response messages.

* * * * *